United States Patent [19]

Luthra et al.

[11] Patent Number: 5,077,140

[45] Date of Patent: Dec. 31, 1991

[54] COATING SYSTEMS FOR TITANIUM OXIDATION PROTECTION

[75] Inventors: Krishan L. Luthra, Schenectady; Douglas W. McKee, Burnt Hills, both of N.Y.

[73] Assignee: General Electric Company, Schenectady, N.Y.

[21] Appl. No.: 511,162

[22] Filed: Apr. 17, 1990

[51] Int. Cl.$^5$ ................................................ B32B 15/01
[52] U.S. Cl. ................................ 428/660; 428/678; 428/937; 427/34; B32B/15/01
[58] Field of Search ................... 428/660, 678, 937; 427/34

[56] References Cited

U.S. PATENT DOCUMENTS

| | | | |
|---|---|---|---|
| 2,900,715 | 5/1956 | Milnes | 29/528 |
| 3,471,342 | 7/1966 | Woods | 148/20.3 |
| 3,691,029 | 3/1971 | Raymond et al. | 204/37 |
| 3,890,456 | 6/1975 | Dils | 428/926 |
| 4,029,477 | 6/1977 | Grisik | 428/680 |
| 4,101,713 | 7/1978 | Hirsch et al. | 428/678 |
| 4,144,380 | 3/1979 | Beltran et al. | 428/679 |
| 4,532,191 | 7/1985 | Humphries et al. | 428/678 |
| 4,839,237 | 6/1989 | Coulon et al. | 428/661 |

FOREIGN PATENT DOCUMENTS

| | | |
|---|---|---|
| 8809396 | 12/1988 | World Int. Prop. O. |
| 8809397 | 12/1988 | World Int. Prop. O. |

OTHER PUBLICATIONS

Emiliani et al., "Sputter-Coatings of Ti-6Al-4V with Inconel 617 . . . ", Surface and Coatings Technology, vol. 33, pp. 267-284, Dec. 1987.
Chevela et al., (I), "Interaction of Plasma Coatings with a Titanium Alloy . . . ", Svar. Proizvod., vol. 3, pp. 26-27, 1981.
Chevela et al., (II), "Study of the Interaction of Plasma Coatings with . . . ", Poroshk. metall., vol. 2, pp. 33-35, 1976.
Davin et al., "A Hot Corrosion Cobalt Base Alloy for Protective Coatings", Chemical Abstracts #89(14):115752b.
Davin et al., "Properties of a Cobalt Superalloy Resistant to High-Temperature Corrosion", Chemical Abstracts #78(18):114581f.
"A Hot Corrosion Cobalt Base Alloy for Protective Coatings", Davin et al., Proceedings-Electrochemical Society, 77-1, 1976, pp. 832-837.
Environmental Protecton to 922K (1200°) for Titanium Alloys, Prepared for National Aeronautics and Space Administration, Contract NAS 3-14339.
Titanium Alloys for High Temperature Applications-a Review, D. Eylon, S. Fujishiro, and F. H. Froes, High Temperature Materials and Processes, vol. 6, No. 1 & 2, 1984, pp. 81-91.
Oxidation Resistant Coatings for Titanium Alloys, N. W. Kearns, and J. E. Restall, Sixth World Conference on Titanium, Proceedings-part IV, Edited By P. Lacombe, R. Tricot, G. Beranger, Societe Francaise de Metallurgie, France 1988.

*Primary Examiner*—R. Dean
*Assistant Examiner*—George Wyszomierski
*Attorney, Agent, or Firm*—James E. McGinness; James C. Davis, Jr.; James Magee, Jr.

[57] ABSTRACT

Coatings that provide substantial oxidation protection for titanium substrates are comprised of a continuous coating of ductile MCrAl or ductile MCr alloys where M is at least one metal selected from the group consisting of iron, nickel, and cobalt. Ductile MCrAl alloys are comprised of, by weight percent: about 10 to 40 percent chromium, about 4 to 10 percent aluminum, and the balance substanitally iron; about 8 to 40 percent chromium, about 4 to 10 percent aluminum, and the balance substantially nickel; or about 10 to 25 percent chromium, about 4 to 5.5 percent aluminum, and the balance substantially cobalt. Ductile MCr alloys are comprised of, by weight percent: about 20 to 40 percent chromium, and the balance substantially iron; about 20 to 50 percent chromium, and the balance substantially nickel; or about 15 to 35 percent chromium, and the balance substantially cobalt. The coatings can be deposited by plasma spraying, chemical vapor deposition, or physical vapor deposition and remain adherent on titanium substrates during repeated thermal cycling while providing substantial oxidation protection up to about 950° C.

26 Claims, 4 Drawing Sheets

COATING SYSTEMS FOR TITANIUM OXIDATION PROTECTION

This invention relates to coatings that provide oxidation protection for titanium and titanium alloys, while remaining adherent during repeated thermal cycling. Ductile alloys, herein referred to by the empirical formulas MCr and MCrAl where Cr is chromium, Al is aluminum, and M is a metal from the group consisting of iron, nickel, and cobalt are deposited to form the coatings.

The components of a gas turbine are heated during the operation of the turbine and then cooled to the ambient temperature when the turbine is stopped. The heating and cooling cycle can be repeated several times a day, for example in an aircraft engine gas turbine, or more infrequently on a weekly or monthly basis, for example in a gas turbine used in power generation. The term "repeated thermal cycling" is used herein to refer to the cyclic heating and cooling normally experienced in the operation of a gas turbine.

There is great technological interest in high strength, low density materials suitable for high temperature use such as titanium and titanium alloys. It is well known such low density materials can improve the efficiency of gas turbines and the thrust to weight ratio of gas turbines used in aircraft engines. A serious limitation to the use of titanium and most titanium alloys in high temperature applications, above about 600° C., is the affinity of titanium for oxygen. Oxygen embrittles titanium, causing a reduction in toughness and creep resistance. In addition, the oxide coatings or scales that form on titanium readily spall at about 600° C.

Metals that form spallable oxide scales are particularly unsuitable for high temperature use because the metal surface continually oxidizes and can lead to premature failure of the metal. Because titanium has a high affinity for oxygen, many titanium alloys are similarly embrittled, and form spallable oxide scales at elevated temperatures. Components, articles, or structural members formed from titanium or titanium alloys are sometimes herein referred to as titanium substrates.

Improvement in the resistance to oxidation of titanium substrates has been sought through the addition of alloying elements that form protective scales. However such alloy additions have not been entirely satisfactory either because oxidation protection is inadequate, or mechanical properties are adversely affected. For example, chromium additions of a few weight percent in titanium substrates have been shown to increase the oxidation rate of titanium. By increasing the chromium addition to at least about 17 weight percent minor reductions in the oxidation rate of titanium have been observed.

Aluminum has been shown to be a more effective additive, generally providing greater oxidation protection as the aluminum concentration increases. Intermetallic compounds of titanium and aluminum such as alpha-2 titanium aluminide, about 25 to 35 atomic percent aluminum, and gamma titanium aluminide, about 50 to 60 atomic percent aluminum, have lower oxidation rates than pure titanium. Good oxidation protection is provided in intermetallic compounds of titanium and aluminum having an aluminum content of about 50 atomic percent or higher. Unfortunately, titanium alloys comprised of 50 atomic percent or higher aluminum are very brittle, and their use in the stressed components of gas turbines has been restricted.

An alternative to alloy additions for providing oxidation protection to titanium substrates is coatings The predominant aspect of high temperature coating technology is the life expectancy of the coating. The coatings composition, structure, porosity, adhesion, operating and coating temperature, and compatibility between the substrate and coating are all considerations in the development of a high temperature coating. Coating adhesion has been a particularly difficult requirement to satisfy in coatings for gas turbine components because the repeated thermal cycling normally experienced by such components in the operation of a gas turbine places severe stresses on the coatings.

Various coatings have been applied to titanium substrates to improve their oxidation resistance. For example diffusion coatings of aluminum, silicon, nickel, zinc, chromium, and nickel aluminide have been applied to commercially pure titanium, Nejedlik, J. F., "Protective Coatings for Titanium Alloy Compressor Blades," TRW Report TM-4580, December 1970. The aluminide and silicide coatings were considered more protective than the other diffused coatings because they exhibited low weight gains during oxidation testing at 650° C. for 1000 hour exposure in air.

Pack cementation is a widely used aluminide diffusion coating process. A mixture of an inert oxide, a halide salt and a source of coating metal such as aluminum are placed in a sealed retort. On heating, the salt decomposes and reacts with the coating metal to form a gaseous metal halogen compound. The metal activity in the gas is higher than the substrate so the coating metal reacts and interdiffuses into the substrate. The pack-cementation process was used to deposit aluminide layers about 40 to 50 microns thick on titanium, "High Temperature Cyclic Oxidation of Aluminide Layers on Titanium," Subrahmanyam, I. and Annapurna, J., Oxidation of Metals, Vol. 26, Nos. 3/4, 1986, pp. 275-285. At lower oxidation temperatures the aluminide layers delayed the beginning of rapid oxidation indicating the layers could extend titanium life considerably at 500° to 700° C. However, cyclic oxidation testing at 950° C. caused rapid oxidation and spalling of the aluminide layers.

Silicide layers of about 10 microns have also been deposited on heated titanium ribbons by the chemical vapor deposition of silane, $SiH_4$. "High-temperature Oxidation of Titanium Silicide Coatings on Titanium," Abba A.,Galerie A., and Caillet M., Oxidation of Metals, Vol. 17, No. 1, 1982, pp. 43-54. Though the silicide coatings were oxidation tested without rapid thermal cycling, at 900° C. longitudinal cracks in the scale and accelerated oxidation were observed.

Ion implantation in titanium of aluminum, boron, tin, caesium, and phosphorus was investigated by Pons, et al. "Oxidation of Ion-implanted Titanium in the 750°-950° C. Temperature Range," Journal of the Less Common Metals, Vol. 109, 1985, pp. 45-46. Phosphorus was found to be the most active, but only reduced the rate of oxide growth by a factor of 2.

Effective long range oxidation protection was provided on titanium substrates up to 590° C. by platinum ion plating. With the use of tungsten as a first coating and platinum as a secondary coating the range of oxidation protection was extended to 700° C. However, these were the highest temperatures under which no spalling or loss of the coating was detected after heating in air for 500 hours. "Titanium Alloys for High Temperature Applications-A Review", D. Eylon, S. Fujishiro, F.H. Froes, High Temperature Materials and Processes, Vol. 6, No. 1&2, 1984, pp. 81–91.

Despite the improvements shown by some of the coatings discussed above, what is still lacking are protective coatings for titanium substrates that remain adherent during repeated thermal cycling and provide substantial oxidation protection at temperatures up to about 950° C. A protective coating on titanium would also reduce the diffusion of oxygen into the metal so that toughness and creep resistance are not adversely reduced.

It is an object of this invention to provide adherent continuous coatings capable of withstanding repeated thermal cycling while providing substantial oxidation protection on titanium substrates at temperatures up to about 950° C.

Another object is to provide continuous ductile MCrAl and MCr alloy coatings capable of withstanding repeated thermal cycling while providing substantial oxidation protection on titanium substrates at temperatures up to about 950° C.

Another object is to provide adherent continuous alloy coatings that form a continuous chromium oxide or aluminum oxide scale when exposed to oxidizing atmospheres at elevated temperatures. The alloy coatings being capable of withstanding repeated thermal cycling while providing substantial oxidation protection on titanium substrates at temperatures up to about 950° C.

Another object of this invention is a method for protecting titanium substrates from oxidation up to about 950° C. under conditions of repeated thermal cycling such as experienced by the components of a gas turbine.

BRIEF DESCRIPTION OF THE INVENTION

We have discovered coatings for titanium substrates that remain adherent during repeated thermal cycling while providing substantial oxidation protection for the substrate at elevated temperatures up to about 950° C. The coatings are comprised of a continuous coating of a ductile MCrAl or MCr alloy wherein M is a metal selected from the group consisting of iron, nickel, or cobalt. Preferably the coating is about 0.0005 to 0.01 inch in thickness. One mil is 0.001 inch, therefore 0.0005 to 0.01 inch is 0.5 to 10 mils.

Ductile MCrAl alloys comprise, by weight percent: about 10 to 40 percent chromium, about 4 to 10 percent aluminum, and the balance substantially iron; about 8 to 40 percent chromium, about 4 to 10 percent aluminum, and the balance substantially nickel; or about 10 to 25 percent chromium, about 4 to 5.5 percent aluminum, and the balance substantially cobalt. Ductile MCr alloys are comprised of, by weight percent: about 20 to 40 percent chromium, and the balance substantially iron; about 20 to 50 percent chromium, and the balance substantially nickel; or about 15 to 35 percent chromium, and the balance substantially cobalt.

Elements known to improve the adhesion of oxide scales such as metals selected from the group consisting of zirconium, silicon, titanium, hafnium, yttrium, scandium, lanthanum, and other rare earth elements can be present up to about 2 weight percent, or more preferably up to about 0.5 weight percent, in the MCrAl or MCr alloys.

The term "balance substantially" means the remaining weight percentage of the alloy, however, other elements which do not interfere with the ductility and oxidation resistance of the alloy may be present either as impurities or up to non-interfering levels. Example's of some other elements that may be present in the remaining weight percent of the ductile MCrAl or MCr alloys, in weight percent are: carbon up to 2 percent, tungsten up to 5 percent, tantalum up to 5 percent, molybdenum up to 1 percent, up to 2 percent rhenium, and for the MCr alloys up to 4 percent aluminum.

The coating is deposited so that it is continuous and at least forms a strong metallurgical bond with the substrate, without substantially reducing the desirable strength, ductility, fatigue, and toughness properties of the substrate. For example, plasma spray, chemical vapor deposition, or physical vapor deposition coating processes form a strong metallurgical bond between the coating and substrate, and can be used to deposit the coatings.

DETAILED DESCRIPTION OF THE INVENTION

Many coatings have been applied to titanium substrates, but coatings heretofore reported have proven inadequate for high temperature oxidation protection of titanium substrates when exposed to the thermal cycling encountered in normal gas turbine operation. In some instances the high reactivity of titanium causes poor adherence between titanium substrates and coatings, in other types of coating systems the mismatch in the coefficient of thermal expansion causes poor adherence, and still other types of coatings have been found to provide insubstantial protection to the titanium substrate.

Figure 1:
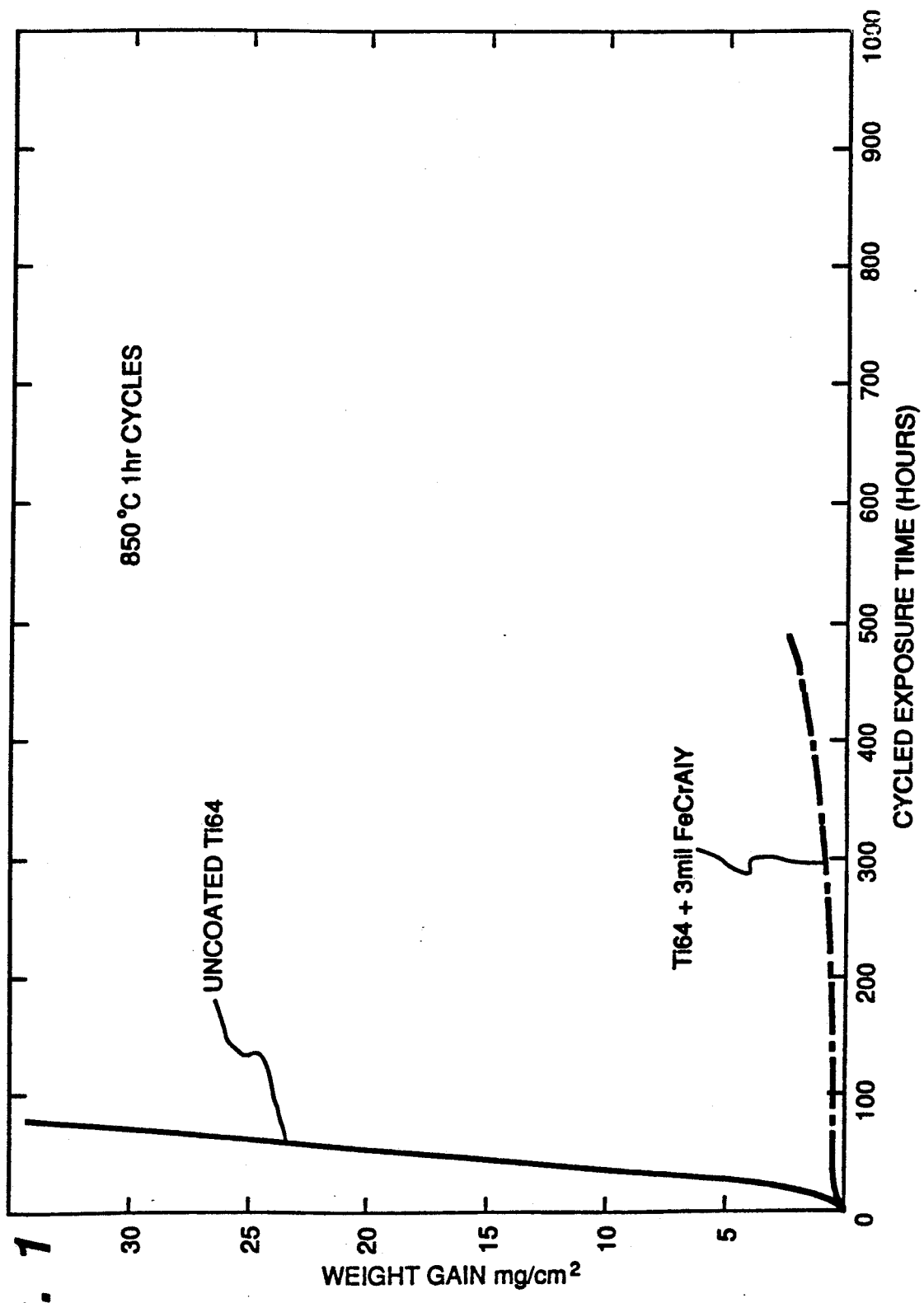
FIGS. 1–4 are graphs showing the weight gain on coated and uncoated titanium substrates exposed to flowing air at elevated temperatures of 800° to 900° C.
Figure 2:
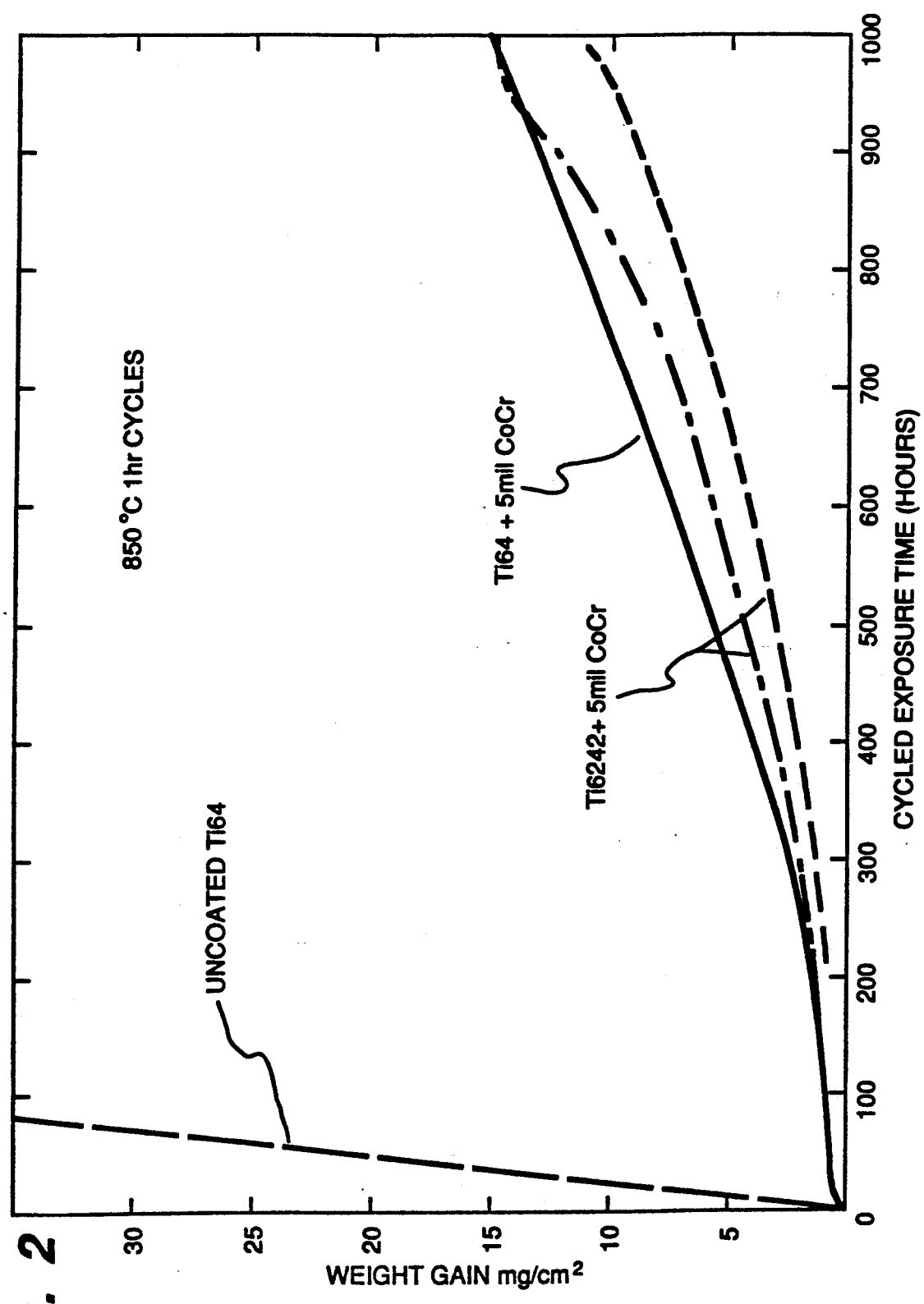

However, we have discovered that a continuous coating, preferably of about 0.5 to 10 mils, of a ductile MCrAl or MCr alloy provides substantial oxidation protection for titanium substrates. Surprisingly, when subjected to the stress caused by repeated thermal cycling in air between room temperature and up to about 950° C., the coating remains adherent and substantially reduces the rate of oxide growth on titanium substrates. For example, the high oxidation rate for uncoated titanium substrates heated and thermally cycled in flowing air as shown by rapid weight gain on the substrate from oxide growth, is reduced to a low rate of oxidation with reduced weight gain from oxide growth when protected by the coatings disclosed herein as shown in FIG. 1 and 2.

Coatings of ductile MCr alloys comprise chromium, aluminum, and at least one of the metals iron, cobalt, or nickel to form continuous aluminum oxide scales while having sufficient ductility to withstand the stress from thermal expansion of titanium substrates. The composition of such ductile MCrAl alloys are shown above, but more preferred compositions having greater ductility or oxidation resistance are comprised of, by weight percent: about 15 to 25 percent chromium, about 5 to 8 percent aluminum, and the balance substantially iron; about 10 to 25 percent chromium, about 5 to 8 percent aluminum, and the balance substantially nickel; or about 15 to 25 percent chromium, about 4 to 5 percent aluminum, and the balance substantially cobalt.

Coatings of ductile MCr alloys comprise chromium, and at least one of the metals iron, nickel, or cobalt to form continuous chromium oxide scales while having sufficient ductility to withstand the stress from thermal expansion of titanium substrates. The composition of such ductile MCr alloys are shown above, but more preferred compositions having greater ductility or oxidation resistance are comprised of, by weight percent: about 25 to 35 weight percent chromium and the balance substantially iron; about 20 to 40 weight percent chromium and the balance substantially nickel; or about 20 to 30 weight percent chromium and the balance substantially cobalt.

The M of the MCrAl and MCr alloys is a metal selected from the group consisting of iron, nickel, cobalt, and mixtures thereof. However it is readily apparent from the ranges of chromium and aluminum disclosed above that the range of chromium or aluminum is dependant upon whether the M is iron, nickel, or in particular cobalt. Therefore, when the balance of the coating alloy is comprised of a ratio of cobalt to nickel or iron greater than 0.5, the ranges of chromium and aluminum are limited to the more narrow ranges disclosed above for the alloys having balance substantially cobalt. For example a coating alloy comprised of chromium, aluminum, and the balance substantially nickel and cobalt, having a ratio of cobalt to nickel greater than 0.5 in the balance of the composition, has the ranges of chromium and aluminum disclosed above for the composition comprised of chromium, aluminum, and the balance substantially cobalt.

The coatings are applied in a manner to at least form a continuous coating having a strong metallurgical bond with the titanium substrate. A metallurgical bond is characterized by interdiffusion of elements at the interface between the substrate and coating. A preferred method of coating application is plasma spraying of the type commercially used and for which commercial apparatus is readily available. Example's of other suitable coating processes are chemical vapor deposition processes such as pack cementation, and physical vapor deposition coating processes such as sputtering, evaporation, and ion plating.

In plasma spraying a powdered alloy composition is applied to a substrate as a layer of substantially molten alloy droplets. The molten droplets are substantially protected from oxidation by the use of inert gases such as a mixture of argon and helium to form the plasma that melts the powder particles, and an inert gas such as argon for powder feeding. The sprayed droplets splat and rapidly solidify conforming to the substrate surface and preceding splats. In this way the coating is bonded to the substrate by several mechanisms. The coating is contoured around the surface topography interlocking with it in a mechanical bond, and interdiffusion at the interface between the coating and substrate causes metallurgical bonding.

The plasma sprayed coatings described above provide substantial protection from oxidation for titanium substrates at temperatures up to about 950° C., however further improvements to the coating can be realized by post-treatments to the coating. For example, plasma sprayed coatings can be annealed to improve interdiffusion and metallurgical bonding, hot isostatically pressed to further densify the coating, or have thin coatings of aluminum or chromium vapor deposited on them and thereby improve the oxidation protection afforded by the coating.

The life of the coatings disclosed above can also be improved by the application of a diffusion barrier layer on the substrate before applying the coating. Suitable diffusion barrier layers are deposited, for example, by sputtering onto the substrate up to several microns of an element known to reduce interdiffusion, such as, tungsten, molybdenum, or chromium. The MCrAl or MCr alloy coatings disclosed herein are then applied on top of the diffusion barrier layer.

The following examples further show the ductile MCrAl and MCr alloys, oxidation protection, and adherence on titanium substrates of the coatings of this invention.

EXAMPLE 1

Titanium alloys having the compositions shown below in Table I were purchased as ⅜ inch rod stock and cut into 1 ¼ inch long test samples.

TABLE 1

| Designation | Composition Weight Percent |
| --- | --- |
| Ti64 | Ti—6Al—4V |
| Ti6242 | Ti—6Al—2Sn—4Zr—2Mo |
| TiAlCrNb | Ti—48Al—2Cr—2Nb |

Note: Titanium is the balance of each composition

The test samples were ground, blasted with 100 mesh aluminum oxide, and coated by the low pressure plasma spray process. The composition of the coating alloys is shown below in Table 2 in an abbreviated form where, for example, FE-24CR-8AL-0.5Y is comprised of, by weight percent, 24% chromium, 8% aluminum, 0.5% yttrium and the balance substantially iron. An Electro Plasma Inc. DC arc plasma gun operating in a sealed chamber maintained at a pressure of 60 torr was used to apply the alloy coatings to a thickness of about 3–5 mils. The plasma was formed by mixing argon and helium, and the alloy powder was fed using argon gas.

TABLE 2

| Plasma-Sprayed Coating Compositions | | |
| --- | --- | --- |
| Type of MCrAl Coating | Type of MCr Coating | Composition (Weight Percent) |
| FeCrAlY | | Fe—24Cr—8Al—0.5Y |
| NiCrAlY | | Ni—23Cr—6Al—0.4Y |
| CoCrAlY | | Co—29Cr—6Al—0.3Y |
| CoNiCrAlY | | Co—32Ni—21Cr—8Al—0.5Y |
| | NiCr | Ni—50Cr |
| | CoCr | Co—30Cr—4W—3Fe—3Ni |

The CoCrAlY and CoNiCrAlY coating compositions shown in Table 2 cracked upon cooling after plasma spraying and were not further tested. Adherent coatings were given a rough buffing treatment in preparation for oxidation test. The coatings were subjected to oxidation testing in flowing air by two methods. Some samples were isothermally heated to a predetermined test temperature over a long period of time while others were repeatedly thermally cycled between room temperature and the test temperature. Isothermally heated samples were removed from the heating furnace and cooled to room temperature for weighing at intervals of about 48 hours.

For the cycled tests a furnace was rapidly raised to surround the samples for heating and lowered from the test samples at predetermined intervals to allow for cooling. The samples were heated in 1 hour cycles by raising the furnace for 45 minutes and then lowering the furnace for 15 minutes. Every 24 hours the samples were weighed on an analytical balance to determine the increase in weight from oxide growth. Samples were heated in 4 hour cycles by raising the furnace for 3 hours and 45 minutes and then lowering the furnace for 15 minutes. The samples were weighed on an analytical balance at each cooling interval in the 4 hour cycle. During heating the samples were heated to the test temperature in about 5 minutes while cooling to room temperature typically took 2 to 3 minutes.

EXAMPLE 2

A chromium coating was applied by the pack-cementation process on coupons having the Ti substrate in Table 1. The coupons were inserted in a powder pack consisting of, in weight percent, about 65% chromium powder, about 25% alumina powder, and about 10% ammonium chloride. The pack was heated to about 1000° C. for about 1 hour in an atmosphere of hydrogen and argon, forming a chromium coating of about 50 microns. A bronze colored surface layer believed to be comprised of chromium and titanium intermetallic compounds was observed on the coupons. The chromium coatings applied by the pack-cementation process quickly spalled on heating in air at 855° C.

EXAMPLE 3

Two coupons of titanium were coated with about an 8 micron thick layer of silicon carbide by chemical vapor deposition. The coating was deposited from a vapor of methyl trichlorosilane, $CH_3SiCl_3$, in a 10% hydrogen-argon carrier gas. After exposure for 1 hour at 1000° C., the coupons were uniformly coated with a silicon carbide deposit. One coupon was heated in flowing air at 800° C. for a period of 12 hours. After the isothermal heating, the coated specimen had an oxide weight gain of about 3 mg/cm$^2$ and the coating was spalling from the substrate. The second coupon was exposed to flowing air at 850° C. with rapid thermal cycling to room temperature every hour. The thermally cycled coupon had an oxide weight gain of about 8 mg/cm$^2$ in a 24-hour period and the coating was spalling from the substrate.

EXAMPLE 4

A coupon of titanium was coated on all surfaces with a 3 micron layer of aluminum by sputtering with a radio frequency current. The coupon was heated in flowing air at 800° C. for a period of 30 hours. After the isothermal heating the coated coupon had an oxide weight gain of about 2 mg/cm$^2$ and the aluminum coating was cracked.

Another coupon of titanium was coated on all surfaces with a 3 micron layer of platinum by sputtering with a radio frequency current. The coupon was heated in flowing air at 900° C. for a period of 7 hours. After the isothermal heating the coated specimen had an oxide weight gain of about 4mg/cm$^2$ and the platinum coating had begun to spall from the substrate.

Figure 3:
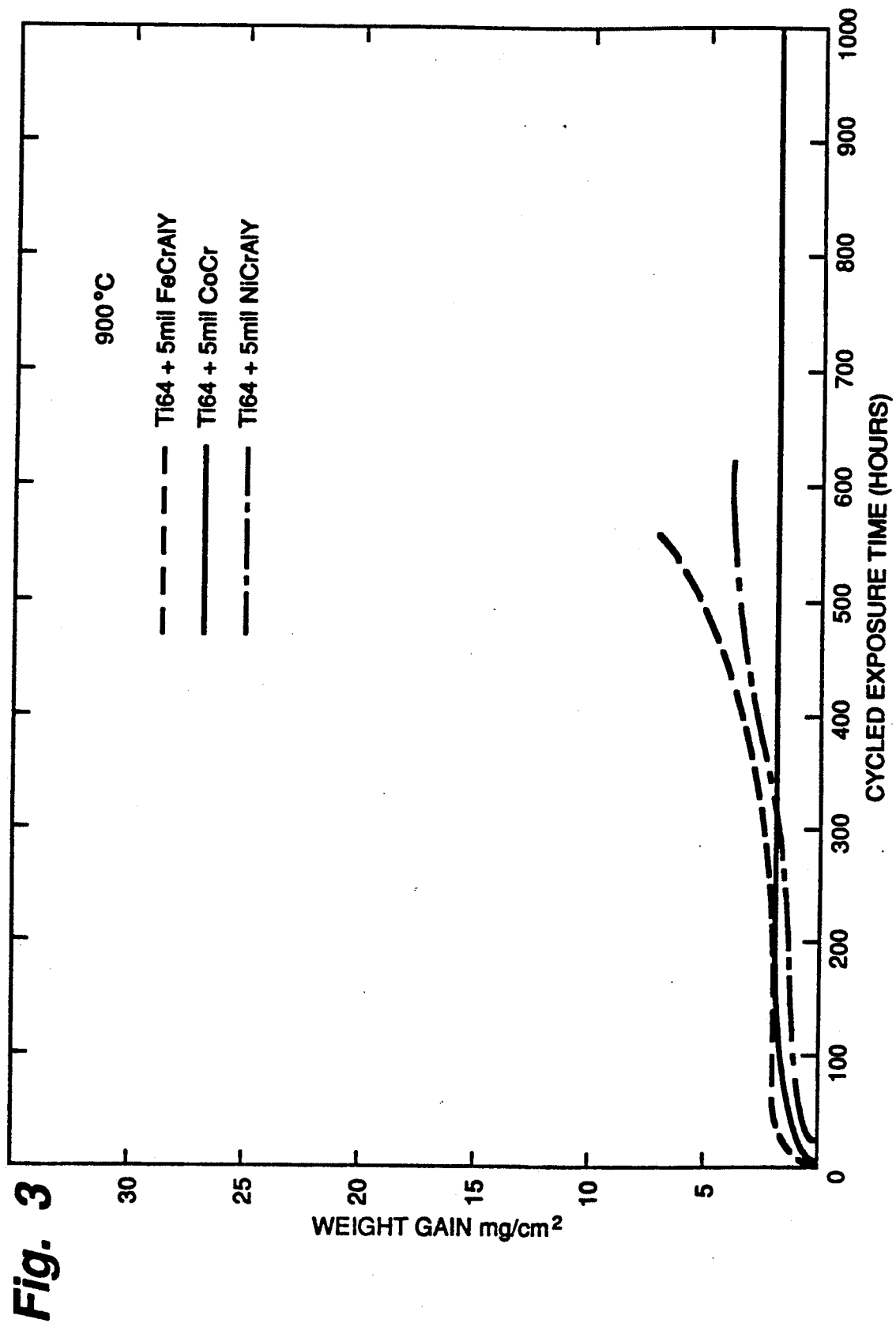
Figure 4:
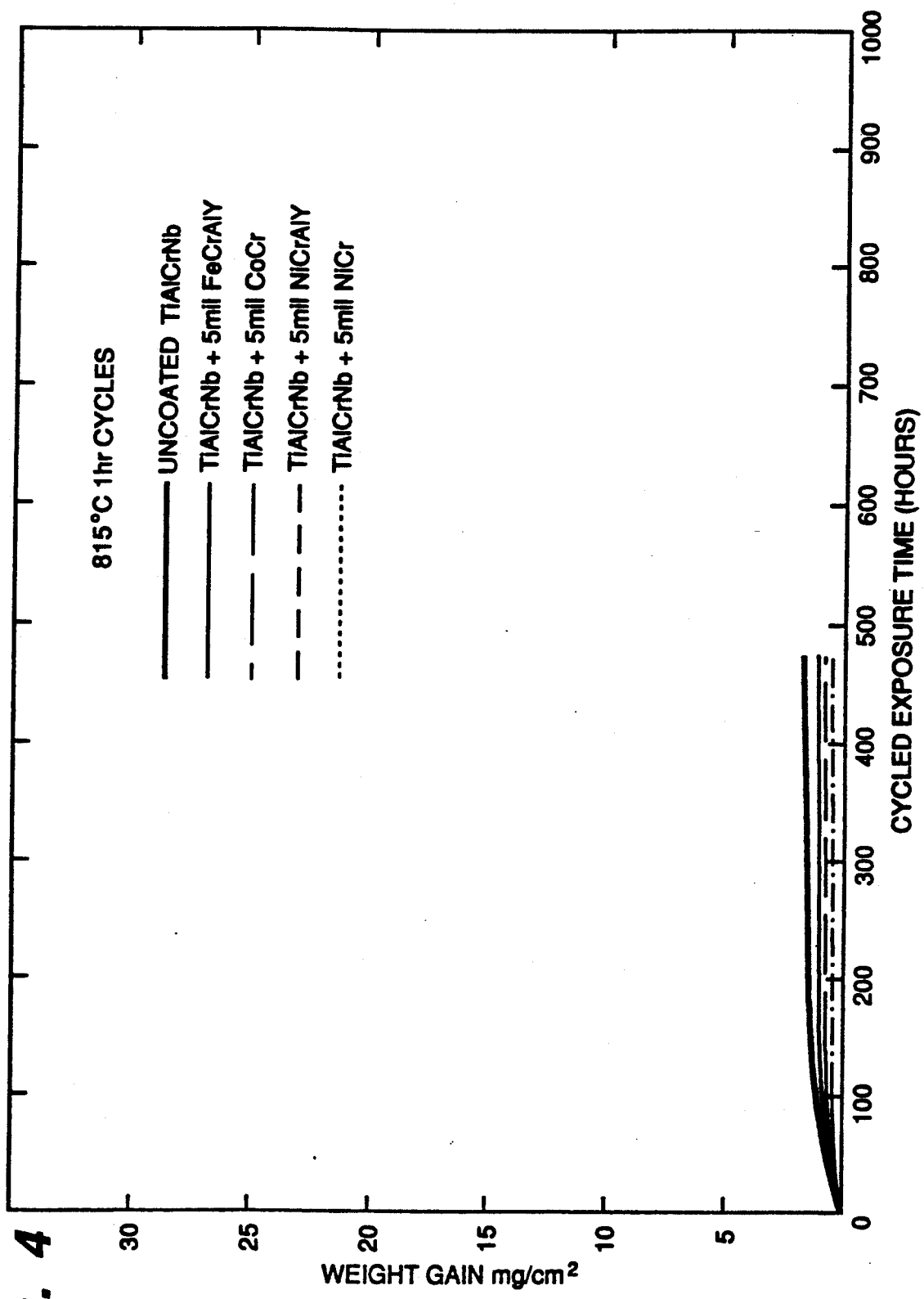

Referring to the oxidation testing in Example 1, the weight gain measurements are shown by the curves in FIGS. 1–4, where the weight gain in milligrams per square centimeter is plotted on the ordinate as a function of exposure time as plotted on the abscissa. FIGS. 1, 2, and 4 show the results from samples that were thermally cycled every hour, and FIG. 3 shows the results from samples that were isothermally heated. The FeCrAlY, NiCrAlY, CoCr and other names for the coatings shown in FIGS. 1–4, and discussed below, correspond to the designations for the coating compositions in Table 2.

FIG. 1 shows the weight gain on Ti64 samples uncoated and coated with a 3 mil FeCrAlY coating, that were heated to 850° C. for about 500 hours with periodic thermal cycling. FIG. 2 shows the weight gain on Ti64 and Ti6242 samples uncoated and coated with a 5 mil CoCr coating, that were heated to 850° C. for about 1000 hours with periodic thermal cycling. FIG. 3 shows the weight gain on three Ti64 samples, one having a 5 mil FeCrAlY coating, another a 5 mil NiCrAlY coating, and another a 5 mil CoCr coating, that were isothermally heated to 900° C. for about 600 or 1000 hours. FIG. 4 shows the weight gain on an uncoated TiAlCrNb sample, and coated TiAlCrNb samples having a 5 mil coating of; FeCrAlY, NiCrAlY, CoCr, or NiCr, that were heated to 815° C. for about 500 hours with periodic thermal cycling.

FIGS. 1–4 show the substantial oxidation protection provided by the plasma sprayed ductile MCrAl and MCr alloy coatings. In 850° C. cyclic testing, shown in FIGS. 1–2, the uncoated Ti64 and Ti6242 coupons experienced rapid weight gains, spalling of the oxide scale, and oxidized at an essentially linear rate becoming completely oxidized in less than 100 hours. In the same 850° C. cyclic tests the FeCrAlY and CoCr coated samples experienced greatly reduced oxide weight gains of less than about 5 mg/cm$^2$ in about 500 hours and the CoCr coated samples gained less than 10 mg/cm$^2$ in about 1000 hours of exposure in flowing air. In a test not shown in the Figures, Ti64 and Ti6242 samples having 5 mil FeCrAlY coatings gained less than 4 mg/cm$^2$ in 1000 hours of 4 hour cyclic testing at 825° C. in flowing air.

In FIG. 4 it can be seen that the uncoated TiAlCrNb alloy oxidizes at a greatly reduced rate as compared to the uncoated Ti64 and Ti6242 substrates in FIGS. 1–3. However, the MCrAl and MCr coatings applied on the TiAlCrNb test samples provide additional and substantial oxidation protection, the coatings having reduced the oxide weight gain on the TiAlCrNb substrates by more than 50 percent.

In the 900° C. isothermal heating test shown in FIG. 3; the CoCr coated sample gained about 2 mg/cm$^2$ in 1000 hours, the FeCrAlY coated sample gained about 7 mg/cm$^2$ in about 550 hours, and the NiCrAlY coated sample gained about 4 mg/cm$^2$ in 600 hours of exposure to flowing air.

From the slope of the curves for the coated coupons in FIGS. 1–4 it can be seen that the coated coupons oxidized at a reduced and slow rate, characteristic of the oxidation rate for materials having a protective oxide scale. Substantially no visible evidence of spalling was found on any of the coated coupons after the extensive oxidation tests.

In contrast, Examples 2–4 are examples of coatings that did not provide substantial oxidation protection for titanium substrates at elevated temperatures of 800° C. or 900° C. Chromium coatings applied by pack cementation, silicon carbide coatings applied by chemical vapor deposition, and platinum and aluminum coatings deposited by sputtering all cracked and spalled when heated in flowing air at 800° C. to 900° C. in relatively short periods of time of 48 hours or less. Such cracking and spalling exposes the titanium substrate to rapid oxidative attack at such elevated temperatures.

Of the coating compositions shown in Table 2, only the CoCrAlY and the CoNiCrAlY coating alloys cracked or spalled from the substrate. However the composition of the CoCrAlY and CoNiCrAlY alloys in Table 2 do not fall within the ranges of chromium and aluminum disclosed herein for the ductile MCrAl coating alloys of this invention.

The coatings disclosed herein provide excellent oxidation protection on titanium substrates that is characteristic of the oxidation protection provided by protective oxide scales. Protective oxide scales substantially reduce the rate of oxidation on the substrate by substantially reducing the diffusion of oxygen through the scale to the substrate. In addition to providing oxidation protection, the coatings also minimize the diffusion of oxygen into the titanium substrate so that the substrate is not embrittled and ductility, toughness, and resistance to creep are not significantly reduced. Microhardness testing of the substrates after the oxidation testing showed that any increase in hardness, assumed to be from oxygen penetration, was confined to a zone less than 2 mils in depth beneath the coating.

We claim:

1. A method for protecting titanium substrates from oxidation at temperatures of up to about 900° C., comprising:
   plasma spraying onto a titanium substrate a continuous coating of an alloy selected from the group consisting of, by weight percent; about 10 to 40 percent chromium, about 4 to 10 percent aluminum, and the balance substantially iron; about 8 to 40 percent chromium, about 4 to 10 percent aluminum, and the balance substantially nickel; about 10 to 25 percent chromium, about 4 to 5.5 percent aluminum, and the balance substantially cobalt; the coating capable of remaining adherent after repeated thermal cycling.

2. The method of claim 1 wherein the alloy is additionally comprised of up to about 2 weight percent of a metal selected from the group consisting of zirconium, silicon, titanium, hafnium, yttrium, scandium, lanthanum, and other rare earth elements.

3. The method of claim 1 wherein the alloy comprises, by weight percent, about 15 to 25 percent chromium, about 5 to 8 percent aluminum, and the balance substantially iron.

4. The method of claim 3 wherein the alloy is additionally comprised of up to about 0.5 weight percent of a metal selected from the group consisting of zirconium, silicon, titanium, hafnium, yttrium, scandium, lanthanum, and other rare earth elements.

5. The method of claim 1 wherein the alloy comprises, by weight percent, about 10 to 25 percent chromium, about 5 to 8 percent aluminum, and the balance substantially nickel.

6. The method of claim 5 wherein the alloy is additionally comprised of up to about 0.5 weight percent of a metal selected from the group consisting of zirconium, silicon, titanium, hafnium, yttrium, scandium, lanthanum, and other rare earth elements.

7. The method of claim 1 wherein the alloy comprises, by weight percent, about 15 to 25 percent chromium, about 4 to 5 percent aluminum, and the balance substantially cobalt.

8. The method of claim 7 wherein the alloy is additionally comprised of up to about 0.5 weight percent of a metal selected from the group consisting of zirconium, silicon, titanium, hafnium, yttrium, scandium, lanthanum, and other rare earth elements.

9. A method for protecting titanium substrates from oxidation of temperatures of up to about 950° C., comprising:
   plasma spraying onto a titanium substrate a continuous coating of an alloy selected from the group consisting of, by weight percent: about 20 to 40 percent chromium, and the balance substantially iron; about 20 to 50 percent chromium, and the balance substantially nickel; about 15 to 35 percent chromium, and the balance substantially cobalt; the coating capable of remaining adherent after repeated thermal cycling.

10. The method of claim 9 wherein the alloy is additionally comprised of up to about 2 weight percent of a metal selected from the group consisting of zirconium, silicon, titanium, hafnium, yttrium, scandium, lanthanum, and other rare earth elements.

11. The method of claim 9 wherein the alloy comprises, by weight percent, about 25 to 35 percent chromium, and the balance substantially iron.

12. The method of claim 11 wherein the alloy is additionally comprised of up to about 0.5 weight percent of a metal selected from the group consisting of zirconium, silicon, titanium, hafnium, yttrium, scandium, lanthanum, and other rare earth elements.

13. The method of claim 9 wherein the alloy comprises, by weight percent, about 20 to 40 percent chromium, and the balance substantially nickel.

14. The method of claim 13 wherein the alloy is additionally comprised of up to about 0.5 weight percent of a metal selected from the group consisting of zirconium, silicon, titanium, hafnium, yttrium, scandium, lanthanum, and other rare earth elements.

15. The method of claim 9 wherein the alloy comprises, by weight percent, about 20 to 30 percent chromium, and the balance substantially cobalt.

16. The method of claim 15 wherein the alloy is additionally comprised of up to about 0.5 weight percent of a metal selected from the group consisting of zirconium, silicon, titanium, hafnium, yttrium, scandium, lanthanum, and other rare earth elements.

17. The method of claim 9 wherein the coating is about 0.5 to 10 mils in thickness.

18. An oxidation resistant coated article comprising; a titanium substrate, and a continuous coating of an alloy comprising, by weight percent, about 15 to 35 percent chromium, and the balance substantially cobalt, the coating being metallurgically bonded to the substrate and remaining adherent after repeated thermal cycling.

19. The article of claim 18 wherein the coating is about 0.5 to 10 mils in thickness.

20. The article of claim 18 wherein the alloy is additionally comprised of up to about 2 weight percent of a metal selected from the group consisting of zirconium, silicon, titanium, hafnium, yttrium, scandium, lanthanum, and other rare earth elements.

21. The article of claim 18 wherein the chromium is about 15 to 25 percent.

22. The article of claim 21 wherein the alloy is additionally comprised of up to about 0.5 weight percent of a metal selected from the group consisting of zirconium, silicon, titanium, hafnium, yttrium, scandium, lanthanum, and other rare earth elements.

23. The article of claim 18 wherein the alloy comprises, by weight percent, about 10 to 25 percent chromium, about 4 to 5.5 percent aluminum, and the balance substantially cobalt.

24. The article of claim 23 wherein the alloy is additionally comprised of up to about 2 weight percent of a metal selected from the group consisting of zirconium, silicon, titanium, hafnium, yttrium, scandium, lanthanum, and other rare earth elements.

25. The article of claim 18 wherein the alloy comprises, by weight percent, about 15 to 25 percent chromium, about 4 to 5 percent aluminum, and the balance substantially cobalt.

26. The article of claim 25 wherein the alloy is additionally comprised of up to about 0.5 weight percent of a metal selected from the group consisting of zirconium, silicon, titanium, hafnium, yttrium, scandium, lanthanum, and other rare earth elements.

* * * * *